United States Patent [19]

Ezawa et al.

[11] Patent Number: 4,969,194
[45] Date of Patent: Nov. 6, 1990

[54] APPARATUS FOR DRILLING PRONUNCIATION

[75] Inventors: Sadaaki Ezawa, Hamamatsu; Hiroaki Takano, Shizuoka; Ryoichi Endoh, Hamamatsu, all of Japan

[73] Assignee: Kabushiki Kaisha Kawai Gakki Seisakusho, Japan

[21] Appl. No.: 399,388

[22] Filed: Aug. 25, 1989

[30] Foreign Application Priority Data

Dec. 22, 1986 [JP] Japan ................. 61-303772

[51] Int. Cl.5 ............................. G10L 5/00
[52] U.S. Cl. ...................... 381/48; 381/51; 381/43
[58] Field of Search ............. 381/48, 51–53, 381/43

[56] References Cited

U.S. PATENT DOCUMENTS

| | | | |
|---|---|---|---|
| 3,634,759 | 1/1972 | Koshikawa | 381/48 |
| 3,676,595 | 7/1972 | Dolansky | 381/48 |
| 3,881,059 | 4/1975 | Stewart | 381/48 |
| 3,932,948 | 1/1976 | Goddard et al. | 35/9 A |
| 4,276,445 | 6/1981 | Harbeson | 381/48 |
| 4,580,133 | 4/1986 | Matsuoka et al. | 381/48 |
| 4,627,001 | 12/1986 | Stapleford | 381/48 |
| 4,641,343 | 2/1987 | Holland | 381/48 |

Primary Examiner—Emanuel S. Kemeny
Attorney, Agent, or Firm—Michael N. Meller

[57] ABSTRACT

An apparatus for drilling the pronunciation of language has a transducer for forming drill voice signals representing a practice utterance of a trainee and a reproducer for generating reference voice signals representing model pronunciation of the utterance. The drill and reference voice signals are compared by a processor and a sensible signal is produced to indicate whether the practice utterance corresponds to the model pronunciation.

10 Claims, 14 Drawing Sheets

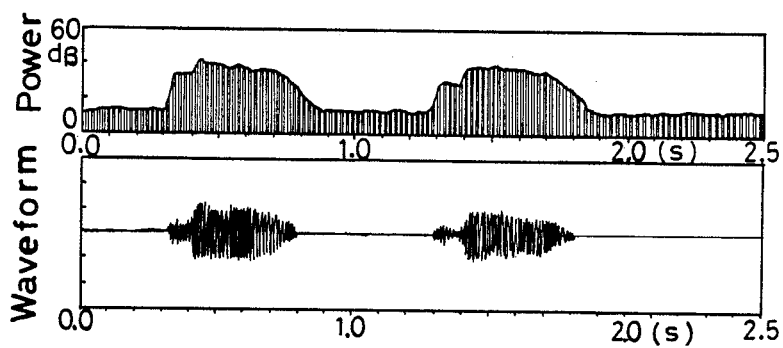
FIG.3-1(A)
FIG.3-1(B)
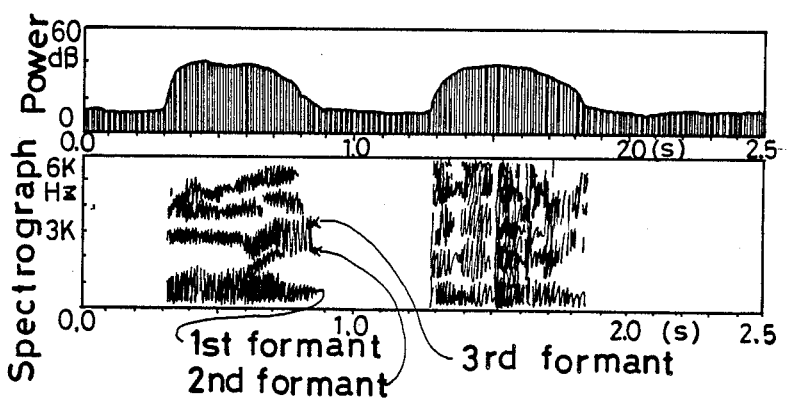
FIG.3-2(A)
FIG.3-2(B)
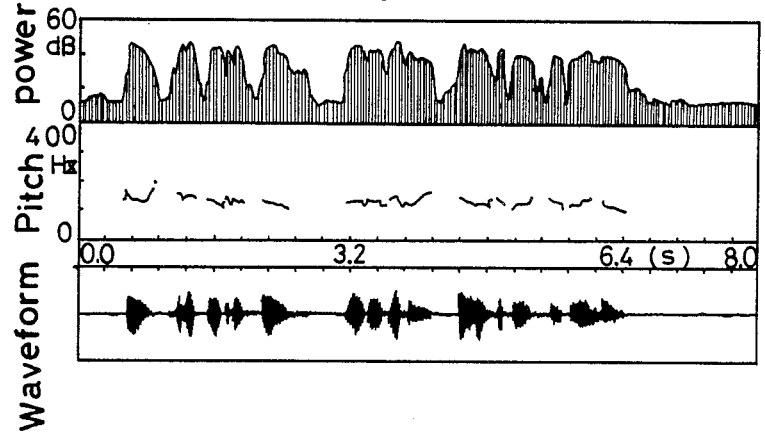
FIG.3-3(A)
FIG.3-3(B)
FIG.3-3(C)

APPARATUS FOR DRILLING PRONUNCIATION

This application is a continuation, of application Ser. No. 136,862, filed Dec. 22, 1987 now abandoned.

FIELD OF THE INVENTION

The present invention relates to an apparatus for drilling pronunciation of foreign languages.

BACKGROUND OF THE INVENTION

In drilling the pronuncation of a foreign language, a trainee often asks a person who speaks the foreign language as a mother tongue (hereinafter referred to as "native speaker") to evaluate his pronunciation. Further, the trainee can drill by himself using cassette tapes, videotapes, record disks, and books that are commerically available.

Evaluation of pronunciation by the native speaker involves difficulty in that the native speaker finds it difficult to explain subtle difference of pronunciation to the trainee and further that the native speaker seldom lives near the trainee. When cassette tapes or the like are used, the drill chiefly consists of a repetition of an exercise based upon hearing judgment. The image provided by a videotape is effective for explaining the word spelling, phonetic symbols, mouth shape, tongue position, and scenery, but is not very helpful for drilling pronunciation; i.e., evaluation is solely based upon the hearing sense of the trainee. In short, cassette tapes and the like do not precisely explain how the trainee can pronounce the words correctly. In other words, the trainee finds it difficult to known how close his pronunciation is getting to correct pronunciation and thus enjoys limited success in learning the language being studied.

SUMMARY OF THE INVENTION

The object of the present invention is to provide an apparatus for drilling pronunciation, which eliminates the aforementioned inconvenience inherent in the conventional art.

In order to achieve the above-mentioned object, the present invention deals with an apparatus which comprises: means for explaining a point of observation and a character on a pattern of voice parameter which accompanies the pronunciation for each of a plurality of drilling modes; voice analyzing means which analyze a voice parameter accompanying the pronunciation of a trainee for each of the plurality of drilling modes, and which displays a pattern of the voice parameter; means which compare the pronunciation character data measured from the pattern of the voice parameter of the trainee with model pronunciation character data; and means which display comments depending upon the result determined by the comparator means.

To effectively correct the pronunciation, it is essential to known fully the defects of pronunciation of Japanese people and to clarify the points to be corrected through pronunciation drilling.

In the case of the English language, the correction points of pronunciation can be classified into the following drilling modes: E1, stress and accent; E2, intonation; E3, vowels; and E4, consonants.

The Japanese language is pronounced based upon thoracic breathing, whereas the English language is pronounced featuring stress and accent based upon abdominal breathing. When the speaker puts his hand on his abdomen and feels the vibration during an utterance, it means that the utterance is based upon abdominal breathing. Chiefly, nouns, verbs, adjectives and adverbs are strongly pronounced. For example, in the following sentence the portions with an accent mark are strongly pronounced: I found your pen.

Intonation is a combination of pitches (pitches of voice) having different levels in accordance with the following relationships: level 1, the lowest pitch, occurs at the end of a sentence; level 2, the next to lowest pitch, occurs at the start of a sentence; level 3, the next to highest pitch, occurs during speech portions with accent; and level 4, the highest pitch, occurs during expression of emotions.

The first sentence shown in FIG. 13 starts with pitch of level 2, changes to pitch of level 3 and ends with pitch of level 1.

The level of intonation changes in a manner of 2→3→1 no matter how long the sentence is. An interrogative sentence (the second sentence in FIG. 13) starts with pitch of level 2 and ends with pitch of level 3.

With regard to drilling mode E3, the duration in which a vowel may be standardized and the character of the intensity of sound (power of voice, which is hereinafter simply referred to as power) are taken out. In addition to the duration and the power, there are such features as opening and closing of jaws, roundness of lips, motion of tongue in the back and forth direction and in the up and down direction. They can be evaluated based on the showing of first, second and third formants. Among these, a particularly important point of correction is the duration. The Japanese language consists of syllables as units in which consonants and vowels are pronounced in combination for nearly the same duration, as shown in the third example in FIG. 13.

In the English language, on the other hand, a vowel just before the termination of a word is pronounced longer when a word terminates in a voiced sound than when the word terminates in a voiceless sound, as shown in FIG. 12.

Further, a vowel just before the termination of a word is pronounced long when the word terminates in a vowel (see FIG. 12).

With regard to drilling mode E4, the point of correction for a consonant may differ depending upon its position, such as the start of a word (e.g., part) or the termination of a word (e.g., stop).

/p-, t-, k-/: length of aspiration
/-p, -t, -k/: presence of absence of aspiration
/b-, d-, g-/: presence of absence of an explosive
/-b, -d, -g/: presence or absence of an explosive
/s, z, ʒ, ʃ, f, u, θ, ð/: length of a frictional sound
/m, n, η/: length of a nasal sound formant after a vowel formant
/r, l/: rise of vowel formant Aspiration plays an important role in a voiceless explosive in a consonant. The longer the duration of aspiration, the stronger the sound. On the other hand, the shorter the duration of aspiration, the weaker the sound.

Duration plays an important role for the fricational sound. The duration should be longer for strongly pronouncing the sound.

For each of the aforementioned plurality of drilling modes, such characteristics as the duration of aspiration and the like which make a point of special observation on a pattern of a voice parameter accompanying the pronunciation are first displayed and then the voice accompanying the pronunciation of the trainee is analyzed by voice analyzing means to display the pattern of the voice parameter. When the trainee inputs the pronunciation characteristic data measured from the pattern, the comparator means compares the pronunciation characteristic data with corresponding model pronunciation characteristic data. In response to the thus compared result, the display means displays commentary for the purpose of correction. The trainee then drills his pronunciation based upon the commentary.

BRIEF DESCRIPTION OF THE DRAWINGS

An embodiment of the invention will now be explained in detail with reference to the drawings wherein:

FIGS. 3-1(A-B), 3-2(A and B) and 3-3(A, B and C) are diagrams illustrating patterns of voice parameters;

FIG. 9-2 is a flowchart illustrating in detail the major portions of FIG. 9-1;

FIGS. 10(A) and 10(B) are diagrams showing a voice parameter of a native speaker;

FIGS. 11(A) and 11(B) are diagrams showing a voice parameter of a trainee which corresponds to that of the native speaker of FIGS. 10(A) and 10(B);

FIG. 12 illustrates the pronunciation of vowel sounds preceding termination of certain English words; and FIG. 13 illustrates the variation in pitch level in two English sentences and the duration of the syllables of a Japanese phrase.

FIG. 1 is a block diagram which illustrates a preferred embodiment of the present invention wherein in the video disk 1 are mainly stored the explanation of the characteristic of pronunciation and actual pronunciation by a native speaker in the form of images. A video disk player 2 is controlled by a personal computer 3 via a bus $L_1$ to access any place in the video disk or to repetitively reproduce any place depending upon the progress or purpose of the trainee.

Figure 1:
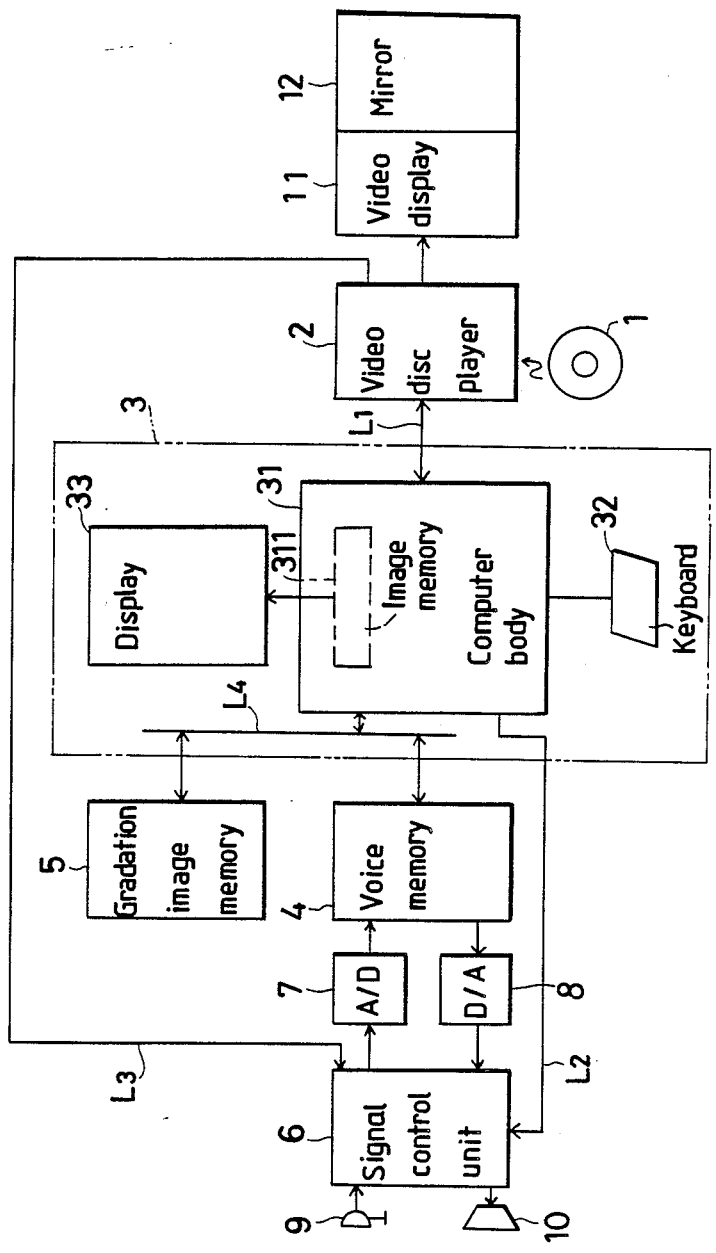
FIG. 1 is a block diagram of an embodiment of the present invention.

The personal computer 3 consists of a computer body 31 having image memory 311 and the like, a keyboard 32 and a display 33. A voice memory 4 connected to the computer body 31 via a bus $L_4$ is used for recording and reproducing the digital samples of the audible analog waveform produced by the trainee during pronunciation and digital samples of the reference analog voice waveform produced by the video disk when played. If two bytes are used per sampling point, the memory capacity, when the voice band is 6 KHz and the sampling frequency is 12 KHz, will be $2 \times 12,000 = 24,000$ bytes/sec. (12,000 sampling points). Therefore, the capacity of 240,000 bytes (120,000 sampling points) is provided since the requirement will be fully satisfied if voice can be recorded for 10 seconds.

A gradation image memory 5 connected to the computer body 31 via the bus $L_4$ is used for displaying on a display 33 a full gradation image such as a sound spectrograph. The sound spectrograph is a so-called voiceprint in which the frequency is indicated by the concentration on a plane where the abscissa represents a time axis and the ordinate represents the frequency as shown in FIG. 3-2(B). The sound spectrograph is adapted to observing the appearance of formant. If there are 250 points in the direction of the frequency and 1,000 points in the direction of the time and if the gradation si 16 (4 bits), then the capacity will be $(250 \times 1,000 \times 4)/8 = 125,000$ bytes.

A signal control unit 6 controls the flow of signals when a variety of drills are to be executed, and is connected to the voice memory 4 via an A/D converter 7 and a D/A converter 8, is connected to the video disk player 2 via a bus $L_3$, and is further connected to a microphone 9 and a loudspeaker 10. The signal control unit 6 is controlled by the computer body 31 via a bus $L_2$. A video display 11 visualizes video signals of the video disk 1, and a mirror 12 which is arranged close to the video display 11 reflects the forms of the lips, tongue and jaws of the trainee when he pronounces the sound so that they can be compared with those of the native speaker reflected thereon.

Figure 2:
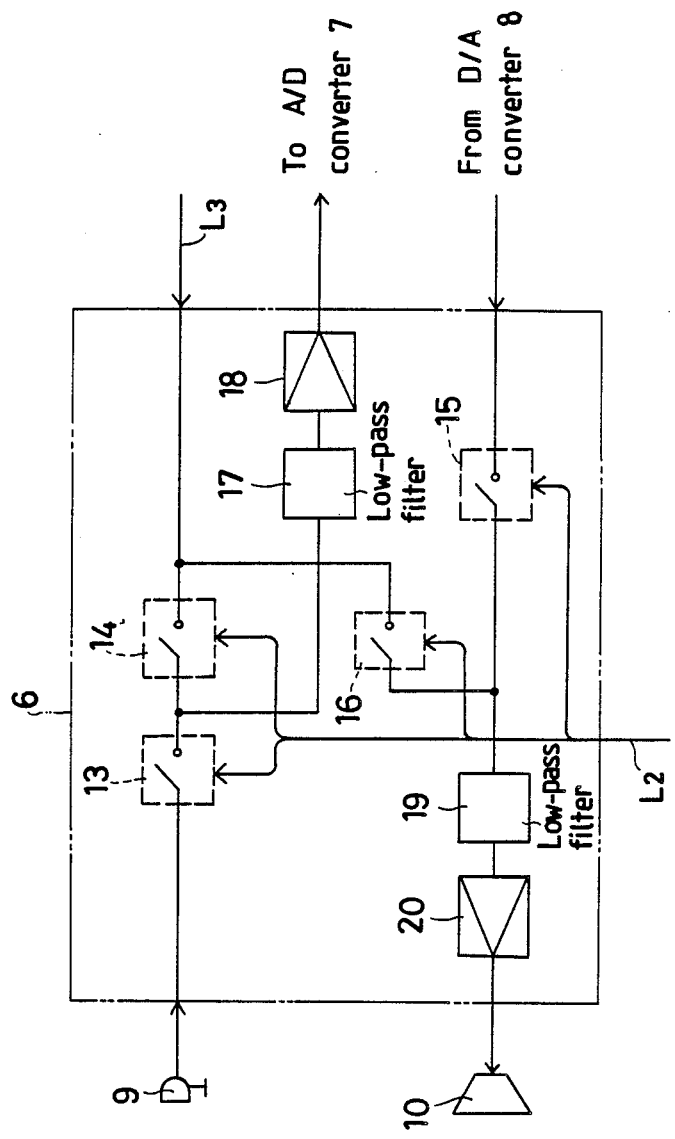
FIG. 2 is a wiring diagram of the signal control unit shown in FIG. 1.

The signal control unit 6 has a circuit structure that is shown in FIG. 2, and controls the flow of signals in executing the operational modes shown in Table 1.

TABLE 1

| OPERATIONAL MODE | FUNCTION |
| --- | --- |
| M1 | Store voice signals of microphone in the voice memory. |
| M2 | Store voice signals of video disk in the voice memory. |
| M3 | Sound the contents of voice memory through the speaker. |
| M4 | Sound the voice signals of video disk through the speaker. |
| M5 | Control the operation of the video disk player. |
| M6 | Analyze the contents of voice memory and display the voice parameters of voice patterns. |

In the circuit of FIG. 2, relays 13, 14, 15 and 16 are controlled by 4-bit parallel signals that are sent from the output port of the computer body 31 onto the bus $L_2$ depending upon the operational modes M1 to M4.

In the case of the operational mode M1, only relay 13 is closed and the voice signals from the microphone 9 pass through a low-pass filter 17 and an amplifier 18, are converted into digital signals through the A/D converter 7, and are written into the voice memory 4.

In the case of the operational mode M2, only relay 14 is closed, whereby voice signals of the video disk 1 sent onto bus $L_3$ pass through the low-pass filter 17 and the amplifier 18, are converted into digital signals through the A/D converter 7 and are written into the voice memory 4.

In the case of the operational mode M3, only relay 15 is closed, whereby the contents read from the voice memory 4 are converted into analog signals through the D/A converter 8, pass through a low-pass filter 19 and an amplifier 20, and are sounded through the loudspeaker 10.

Here, the voice signals are written into or read out from the voice memory 4 that is controlled by bus signals such as address bus signals, data bus signals write signals and read signals that are sent onto the bus $L_4$ from a central processing unit in the computer body 31 in response to the operation modes M1 and M3.

In the case of the operational mode M4, only relay 16 is closed, and the voice signals of the video disk 1 are sounded from the loudspeaker 10 via low-pass filter 19 and amplifier 20.

In the case of the operational mode M5, the personal computer 3 causes an interface (e.g., a widely known RS-232C), which is not shown, to control the video disk player 2 via bus $L_1$. Therefore, video signals of the video disk 1 are sent to the video display 11 and are displayed. Table 2 shows representative control commands for the video disk player 2.

TABLE 2

| COMMAND | OPERATION |
| --- | --- |
| PLAY | Reproduce the video disk from the beginning. |
| REJECT | The video disk ceases to rotate. |
| n1 SEARCH | Search a specified frame number n1 on the disk and display a still image. |
| n2 AUTO STOP | Reproduce starting from the present frame on the video disk, and display a still image when a designated frame number n2 is reached. |

The operational mode M5 is constituted by the control commands shown in Table 2. Table 3 shows the contents of the operational mode M5.

TABLE 3

| OPERATIONAL MODE M5 | FUNCTION |
| --- | --- |
| M51 | Executer PLAY. |
| M52 | Execute REJECT. |
| M53 | Execute n1 SEARCH. |
| M54 | Execute n2 AUTO STOP. |
| M55 | Execute n2 AUTO STOP following n1 SEARCH. |

The operational mode M55 is a control command which reproduces the video signals from the designated frame number n1 to be designated frame number n2, and displays a still image at n2.

When the operational mode M5 is to be executed, the operational condition and the frame number during the reproduction are sent onto the bus $L_1$ from the video disk player 2 depending upon the request from the personal computer 3. Upon their recognition, the operational mode is selected from Table 3 depending upon the content of drilling in the step of correcting pronunciation, and a corresponding control command is returned onto the bus $L_1$ to control the video disk player 2.

In the case of the operational mode M6, the personal computer 3 receives voice signals from the voice memory 4 via bus signals on the bus $L_4$, analyzes the voice, and displays voice parameters of the thus-obtained voice patterns on the display 33.

The voice parameters are divided into four types; i.e., waveform, power, pitch, and sound spectrograph. A combination of some of the parameters displayed depending upon the drilling mode for correcting pronunciation. Table 4 shows operational modes M61 to M63 that are divided as a result of combination.

TABLE 4

| OPERATIONAL MODE M6 | FUNCTION |
| --- | --- |
| M61 | Display power and waveform on the display 33 from the upper side. |
| M62 | Display power and sound spectrograph on the display 33 from the upper side. |
| M63 | Display power, pitch and waveform on the display 33 from the upper side. |

FIGS. 3-1, 3-2 and 3-3 illustrate examples of displays on the display 33 when the operational modes M61, M62 and M63 are executed.

Image data of the sound spectrograph obtained by analyzing the voice using the personal computer 3 are stored in the gradation image memory 5 via bus signals on the bus $L_4$, and image data of waveform, power and pitch are stored in an image memory 311 that is usually contained in the computer body 3. Therefore, when the power and sound spectrograph are to be simultaneously displayed as shown in FIGS. 3-2(A) and 3-2(B), the image data stored in the image memory 311 and the image data stored in the gradation image memory 5 are suitable switched and are sent to the display 33.

To observe the stress accent, intonation, duration and formant that serve as important points for correcting the pronunciation, the display must be so made that the entire image of pronunciation can be grasped as shown in FIGS. 3-1 to 3-3.

The voice memory 4 is capable of recording voice for 10 seconds as mentioned earlier, and can store 120,000 sampling points. On the other hand, if the resolution of the display 33 in the direction of time is 1,000 points, as mentioned in connection with the gradation image memory 5, only one sampling point of every 120 sampling points can be displayed by the display of one stage, which is the method that makes it possible to grasp the whole image most effectively. Because of the limitation imposed on the display, therefore, the voice parameters must be processed.

Described below is the method for calculating voice parameters and the method for processing voice parameters by taking the limitation of the display into consideration.

To display the whole image of the waveform, the sampling points in the voice memory 4 must be thinned out without giving an unnatural impression.

Figure 4:
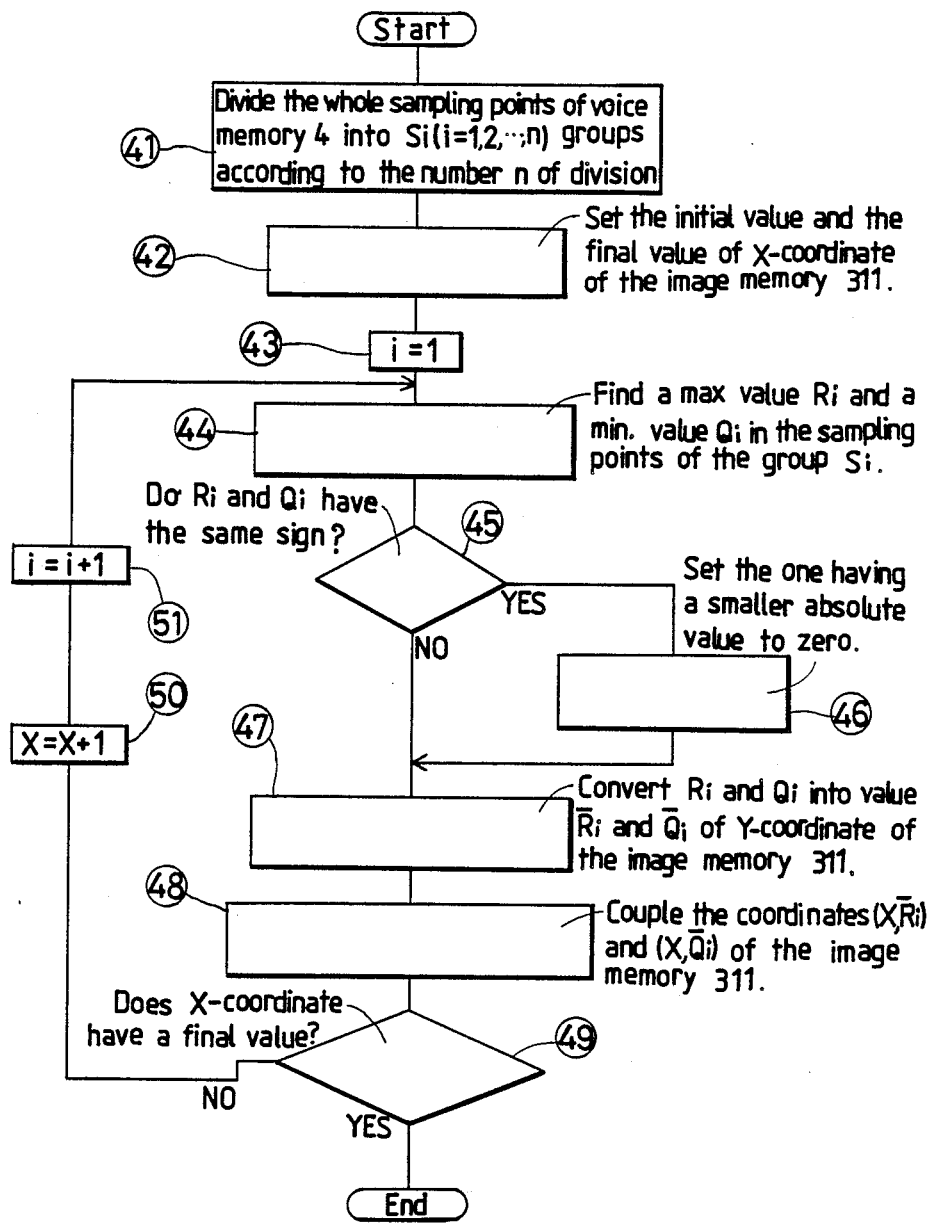
FIG. 4 is a flowchart for processing the waveform.
Figure 5:
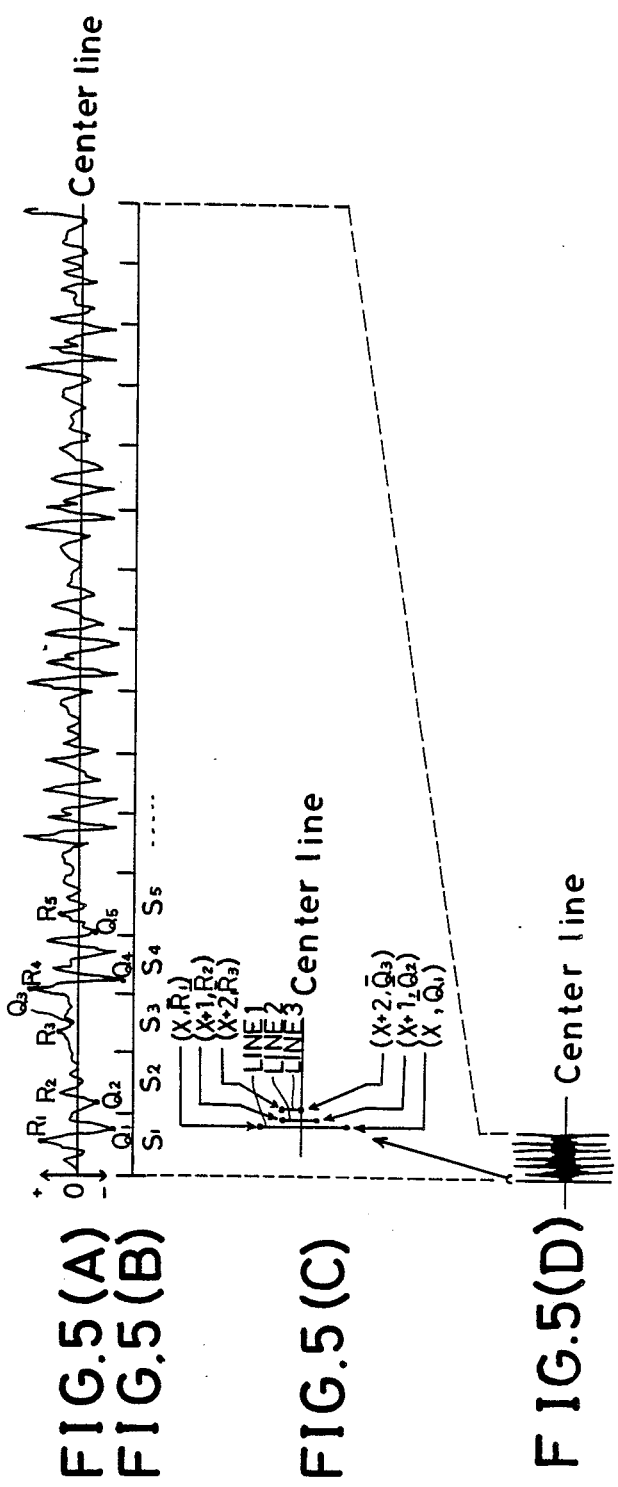
FIGS. 5(A), 5(B), 5(C) and 5(D) are diagrams for explaining the waveform processing.

FIG. 4 is a flowchart for thinning out the waveform, and FIG. 5 is a diagram of explanation thereof.

FIG. 5(A) shows the contents of a starting portion of the voice memory 4 in the form of digital voice signals.

In step 41 of FIG. 4, the digital voice signals which are the contents of the voice memory 4 shown in FIG. 5(A) are divided into groups $S_i$ ($i = 1, 2, 3, \ldots, n$) as shown in FIG. 5(B). An X coordinate and a Y coordinate are set in a memory region of the image memory 311 to correspond to the display position of the display 33. Step 42 sets an initial value and a final value of the X coordinate which determines the range of the direction of time for storing waveform data. Symbol i in step 43 denotes a counter for providing the designation of the group, which designates the group $S_1$ when $i = 1$. In step 44 a maximum value $R_i$ and a minimum value $Q_i$ in the group are found. When $i = 1$, $R_1$ and $Q_1$ are found in the group $S_1$.

Steps 45 and 46 will be explained later. In step 47, the values $R_1$ and $Q_1$ are converted into values $\overline{R_1}$, $\overline{Q_1}$ of the Y coordinate of the image memory 311. The processing to couple the coordinate $(X, \overline{R_1})$ of the image memory 311 and the coordinate $(X, \overline{Q_1})$ together is performed in step 48. This is LINE 1 in FIG. 5(C). If the final value is reached by the X coordinate in step 49, storage of the waveform data is finished. If the final value is not reached, step 50 increases the value of the X coordinate by 1, and $i=2$ is obtained in step 51. Then, the group $S_2$ is designated, and the processing is carried out in the same manner through steps 44–48 to obtain LINE 2.

Thus, the processing of the group is continued until it is determined in step 49 that the X coordinate equals the final value. FIG. 5(D) shows the result obtained by thinning out FIG. 5(A). FIG. 5(C) shows on an enlarged scale the initial portion of FIG. 5(D). Steps 45 and 46 are effective when the number n of division is great and the rate of thin-out is small. That is, as the number n of division increases and the number of sampling points decreases in the group, there often happens that the two values assume the same sign as represented by $R_3$ and $Q_3$ of the group $S_3$. If the processing of coupling is effected in step 48 without doing anything, the area near the center line becomes blank and the whole image of the waveform becomes unnatural. If it is determined in step 45 that the values $R_3$ and $Q_3$ have the same sign, the one having a smaller absolute value is forcibly set to zero in step 46 and the coupling is extended up to the center line as represented by LINE 3.

Next, a relationship is found with respect to the number n of division when the range of the X coordinate for storing the waveform data consists of m points in the image memory 311 and the waveform display time of one stage is t. The voice memory 4 is capable of recording the voice for 10 seconds: each group obtained by being divided by n corresponds to a recording time of 10/n seconds. This can be displayed by m points, so that $t=10 \, m/n$. If $m=800$ points, then $t=10$ seconds with $n=800$ and all the contents of the voice memory 4 are displayed. Further, if $n=1,600$, then the first one-half is displayed in $t=5$ seconds. If $n=3,200$, the first one-quarter is displayed in $t=2.5$ seconds.

As described above, the whole image of the waveform can be favorably displayed on the display 33 if the number n of division is suitably set depending upon the duration of voice that is recorded.

Figure 6:
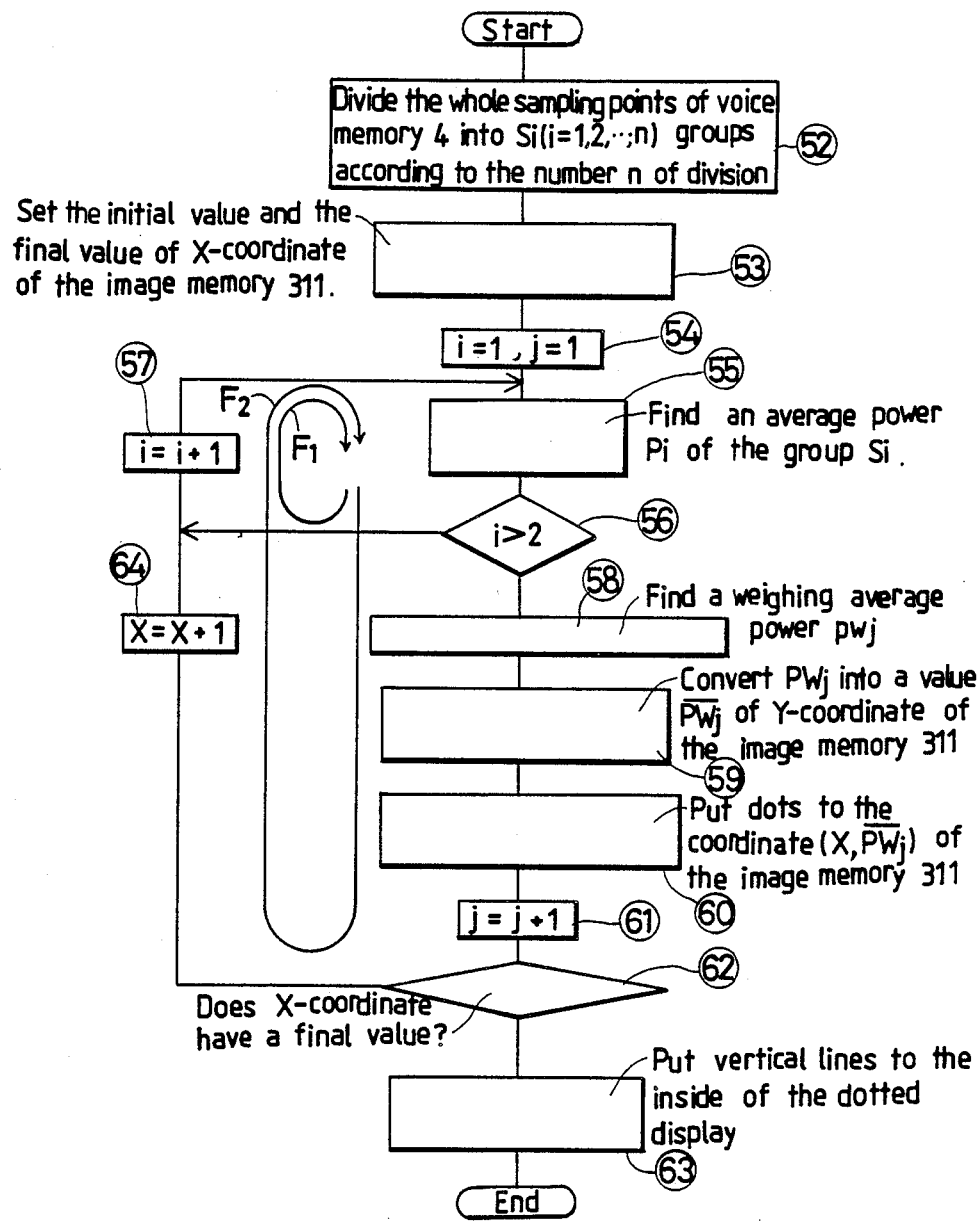
FIG. 6 is a flowchart of the power processing.

The power is processed according to the flowchart of FIG. 6. Namely, the sampling points stored in the voice memory 4 are divided into groups $S_1, S_2, \ldots, S_n$ according to the number n of division, an average power of each of the groups is found, and the power data to be displayed is calculated relying upon the average power.

In step 52 of FIG. 6, the content of the voice memory 4 (see FIG. 5(A)) is divided into groups as shown in FIG. 5(B). The X coordinate and Y coordinate are set in the image memory 311 to correspond to the display position of the display 33. In step 53, the initial value and the final value of the X coordinate are set to determine a range of direction of time for storing power data to be displayed. In step 54, symbol i denotes a counter for providing the group designation, which designates the group $S_1$ when $i=1$. Symbol j denotes a counter for the weighted average power PWj to be found in step 58 that will be described below. The weighted average power PWj serves as the power data to be displayed.

An average power Pi of the group $S_i$ is found in step 55 in accordance with the following equation:

$$Pi = 1/u \sum_{k=1}^{u} \log_{10} x_k^2$$

where $X_k$ is the k-th sampling value of the group $S_i$, and u is the number of sampling points of the group $S_i$.

Here, $P_1$ of the group $S_1$ is found. The result is NO in step 56, and the program loops around F1. In step 57, the counter is $i=2$ again, and $P_2$ is found in step 55. The program loops around F1 again, and the counter is $i=3$ is step 57 and $P_3$ is found in step 55. This time, the counter is $i=3$ and the result is YES in step 56 so that the program proceeds to step 58. The program then loops around F2 until the result is determined to be YES in step 62. The weighted average power PWj is obtained by weighing the average power of several continuous groups, followed by averaging, and is effective for removing fine changes caused by the pitch on the display and for smoothing the curve.

The weighted average power PWj is calculated according to the following equation:

$$PWj = \frac{1}{\sum_{k=1}^{5} W_k} (P_{j-2}W_1 + P_{j-1}W_2 + P_j W_3 + P_{j+1}W_4 + P_{j+2}W_5)$$

where $W_k$ is the weighting.

The weighting is usually recommended to be $W_1=0.2$, $W_2=0.8$, $W_3=1.0$, $W_4=0.8$, and $W_5=0.2$. The average power that does not lie within the range of $P_1$ to $P_n$ and the weighting $W_k$ to be multiplied thereby, should be all zero.

Here, since $j=1$, $PW_1$ is found according to the following equation:

$$PW_1 = \frac{1}{W_3 + W_4 + W_5} (P_1 W_3 + P_2 W_4 + P_3 W_5)$$

In step 59, $PW_1$ is converted into a value $PW_1$ of the Y coordinate of the image memory 311.

In Step 60, the coordinate $(X, \overline{PW_1})$ of the image memory 311 is subjected to the process of having dots stored thereat.

The counter is $j=2$ is step 61. If the X coordinate reaches the final value in step 62, step 63 puts vertical lines to the inside of the display that is dotted, and the program is finished. If the final value is not reached, the program proceeds to step 64, in which the value of the X coordinate is increased by 1. Then $i=4$ in step 57 and $P_4$ is found in step 55. Since $j=2$ in step 58, $PW_2$ is found in accordance with the following equation:

$$PW_2 = \frac{1}{W_2 + W_3 + W_4 + W_5} (P_1 W_2 + P_2 W_3 + P_3 W_4 + P_4 W_5)$$

The program then continues to loop around F2 until it is determined that the X coordinate equals the final value in step 62, and the process is continued. The shift of process is shown in Table 5, and ranges of average power weighted in step 58 are indicated by arrows.

TABLE 5

| Group $S_i$ | $S_1$ | $S_2$ | $S_3$ | $S_4$ | $S_5$ | $S_6$ | $S_7$ | ... | $S_{n-6}$ | $S_{n-5}$ | $S_{n-4}$ | $S_{n-3}$ | $S_{n-2}$ | $S_{n-1}$ | $S_n$ |
|---|---|---|---|---|---|---|---|---|---|---|---|---|---|---|---|
| Average power $P_i$ | $P_1$ | $P_2$ | $P_3$ | $P_4$ | $P_5$ | $P_6$ | $P_7$ | ... | $P_{n-6}$ | $P_{n-5}$ | $P_{n-4}$ | $P_{n-3}$ | $P_{n-2}$ | $P_{n-1}$ | $P_n$ |
| Ranges of power $PW_j$ to be calculated and average power to be weighed | ←$PW_1$→ | ←$PW_2$——→ | ←——$PW_3$——→ | ←——$PW_4$——→ | ←——$PW_5$——→ | | | | | | ←$PW_{n-4}$——→ | ←——$PW_{n-3}$→ | ←——$PW_{n-2}$→ | ←——$PW_{n-1}$→ | ←$PW_n$→ |
| X-coordinate of image memory 311 where $PW_j$ is stored | 1 | 2 | 3 | 4 | 5 | 6 | 7 | ... | n−6 | n−5 | n−4 | n−3 | n−2 | n−1 | n |

When $PW_{n-1}$ and $PW_n$ are to be calculated in Table 5, step 55 finds $S_{n+1}$, $S_{n+2}$ to $P_{n+1}$, $P_{n+2}$ that lie outside the range of the groups $S_1$ to $S_n$. This, however, may or may not be executed. In either case, they are neglected as lying outside the range of $P_1$ to $P_n$ in calculating $PW_j$ in step 58.

When the range of the X coordinate for storing $\overline{PW_j}$ in the image memory 311 is m points and the time for displaying the power of one stage only is t, the relationship with respect to the number n of division is t=10 m/n, as in the case mentioned earlier. After all, when the power and the waveform are to be displayed on the same time axis, like those shown in FIG. 3-1, the value n should be set to be the same.

Figure 7:
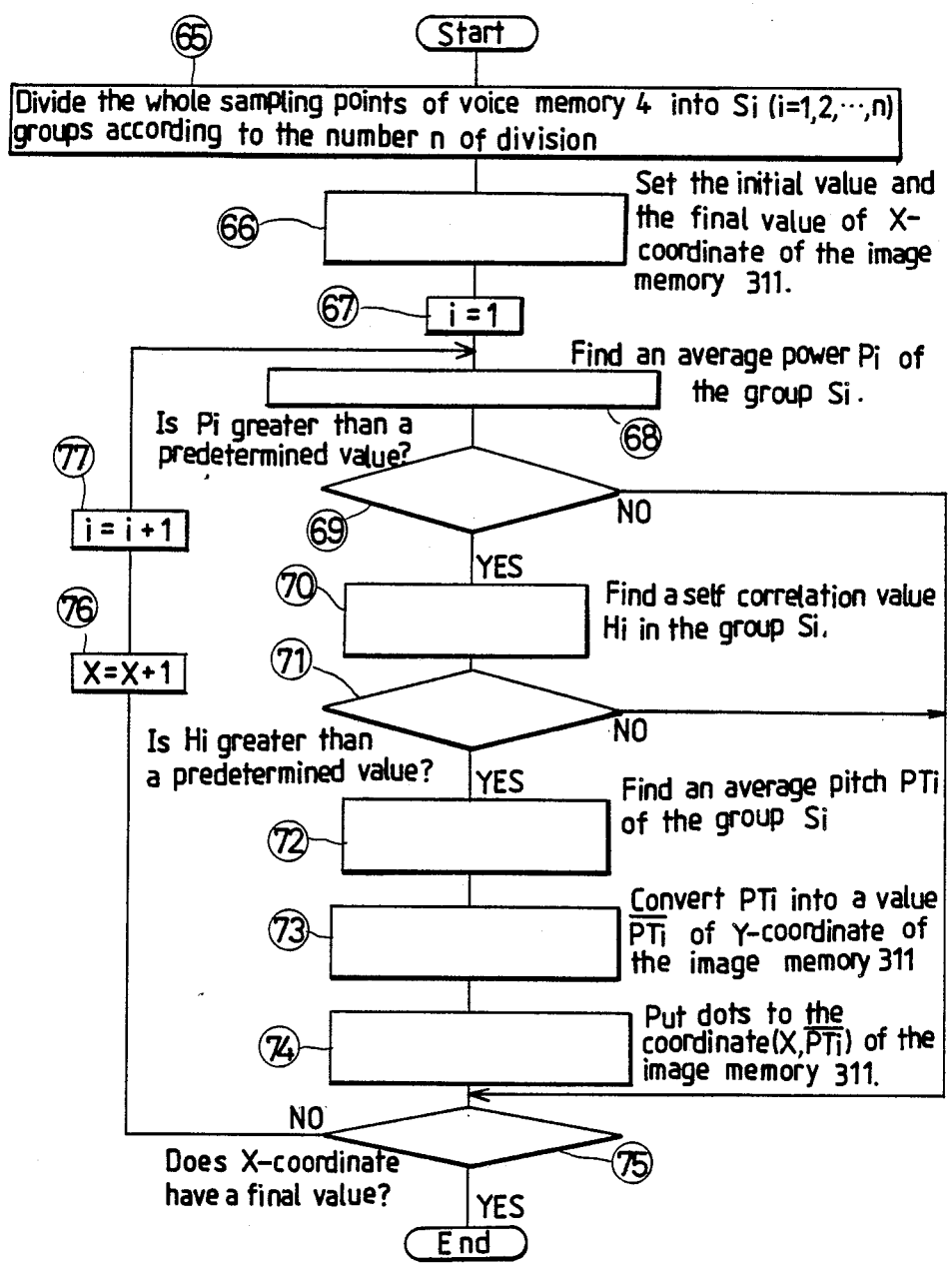
FIG. 7 is a flowchart of the pitch processing.

FIG. 7 shows a flowchart for processing the pitch. The sampling points of the voice memory are divided into groups $S_1$, $S_2$, ..., $S_n$ according to the number n of division, to find an average pitch of voiced sound for each of the groups. In step 65, the content of the voice memory 4 (see FIG. 5(A)) is divided into groups as shown in FIG. 5(B). The X coordinate and Y coordinate are set in the image memory 311 to correspond to the display position of the display 33. In step 66, an initial value and a final value of the X coordinate are set to determine a range of direction of time for storing the display pitch data. Symbol i in step 67 denotes a counter for providing the group designation, which designates the group $S_1$ when i=1. An average power $P_i$ of the group $S_i$ is found in step 68 in the same manner as described earlier. Here, $P_1$ of the group $S_1$ is found. Step 69 discriminates the voiceless sound or the voiced sound depending upon $P_i$. When $P_i$ is not greater than a predetermined value, it means that the sound is the voiceless sound; i.e., there exists no pitch and the program proceeds directly to step 75 to process the next group. When $P_i$ is greater than the predetermined value, the sound is the voiced sound and a self-correlation value $H_i$ in the group is found in step 70. Here, $H_1$ is found. Step 71 discriminates the voiceless sound or the voiced sound depending upon $H_1$. When $H_1$ is not greater than a predetermined value, it means that the sound is the voiceless sound without pitch such as fricational sound or explosive, and the program proceeds directly to step 75 to process the next group. When $H_1$ is greater than the predetermined value, it means that the sound is the voiced sound and step 72 presumes the ranges of pitch period depending upon male, female and child, and obtains a correlation to find an average pitch $PT_i$ in the group. Here, $PT_1$ is found. In step 73, $PT_1$ is converted into a value $\overline{PT_1}$ of the Y coordinate of the image memory 311. Step 74 stores dots at the coordinate (X, $\overline{PT_1}$) of the image memory 311. When the X coordinate reaches the final value in step 75, storage of the pitch data is finished. When the final value is not reached, step 76 increases the value of the X coordinate by 1, and the counter is set to i=2 in step 77. The group $S_2$ is designated this time. The process is then continued for each of the groups until it is determined that the X coordinate equals the final value in step 75. When the range of the X coordinate for storing $PT_1$ in the image memory 311 is m points and the time for displaying the pitch of one stage only is t, the relationship to the number n of division is t=10 m/n in the same manner as described earlier. After all, when the power, pitch and waveform are to be displayed on the same time axis as shown in FIG. 3—3, the value n should be set to be the same.

Figure 8:
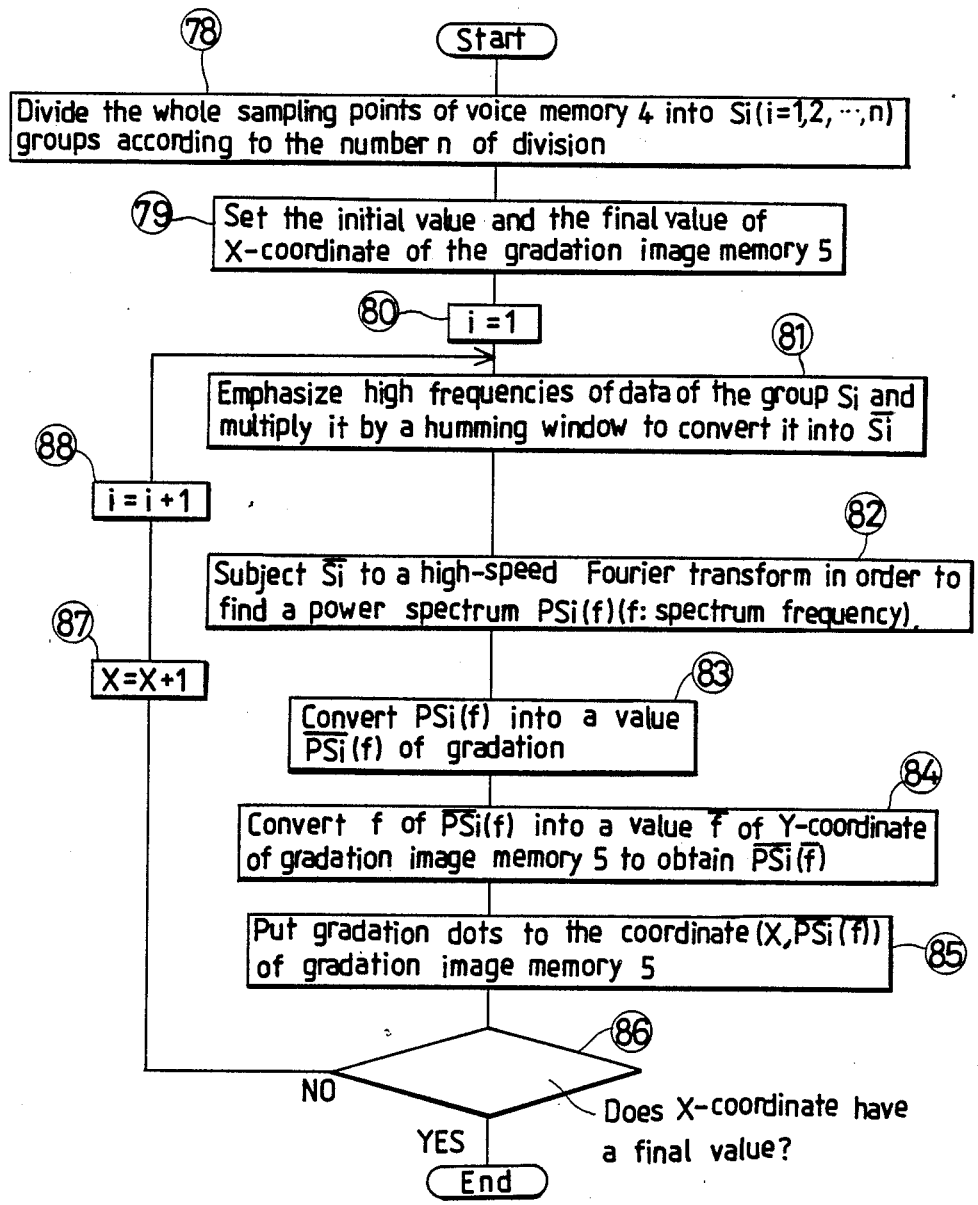
FIG. 8 is a flowchart for the processing of the sound spectrograph.

FIG. 8 shows a flowchart for processing the sound spectrograph. The sampling points of the voice memory are divided into groups $S_1$, $S_2$, ..., $S_n$ according to the number n of division, and the Fourier transform is effected at high speeds for each of the groups to find the power spectrum. In step 78, the content of the voice memory 4 (see FIG. 5(A)) is divided into groups as shown in FIG. 5(B). The X coordinate and Y coordinate are set in the gradation image memory 5 to correspond to the display position of the display 33. In step 79, the initial value and the final value of the X coordinate are set to determine a range of direction of time for storing power spectrum data that is to be displayed. Symbol i in step 80 denotes a counter for providing the group designation, which designates group $S_1$ when i=1. Step 81 emphasizes high frequencies in order to prevent the level of high-frequency components in the power spectrum calculated in the next step 82 from becoming smaller than the low-frequency components, such that the display is uniformalized up to high-frequency regions.

The $\overline{S_i}$ found in step 81 is subjected to the Fourier transform at high speeds in step 82 in order to find a power spectrum $PS_i(f)$. Here, $PS_1(f)$ of the group $S_1$ is found. In step 83, $PS_1(f)$ is converted into a value $\overline{PS_1(f)}$ that corresponds to gradation.

In step 84, the spectrum frequency f of $\overline{PS_1(f)}$ is converted into a value f of the Y coordinate of the gradation image memory 5 to obtain $\overline{PS_1}(\overline{f})$. Step 85 puts gradated dots at the coordinate (X, $\overline{PS_1(\overline{f})}$) of the gradation image memory 5. When the X coordinate reaches the final value in step 86, storage of the power spectrum data is finished. When the final value is not reached, step 87 increases the value of the X coordinate by 1, so that i=2 in step 88. The group $S_2$ is designated this time. The process is continued for each of the groups until it is determined in step 86 that the X coordinate equals the final value.

When the range of the X coordinate for storing $\overline{PS_i(\overline{f})}$ in the gradation image memory 5 is m points and the time for display of one stage only is t, the relationship relative to the number n of division is t=10 m/n, as described earlier. That is, the value n should be set to be the same when the power and sound spectrograph are to be displayed on the same time axis as shown in FIG. 3-2. The sound spectrograph of FIG. 3-2 illustrates a starting portion wherein 1,000 time points are plotted on the X coordinate axis, 250 frequency points are plotted on the Y coordinate axis, and when $\overline{PS_i}(\overline{f})$ is converted to correspond to the gradation, 16 (4 bits) is stored in the gradation image memory 5 via bus signals on L4 and displayed.

Figure 9:
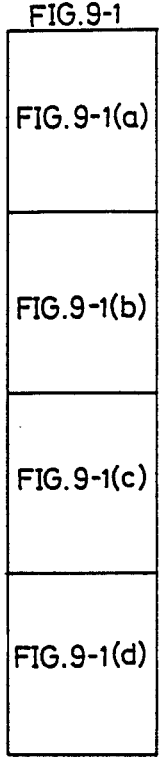
FIG. 9-1A, B, C, and D are a flowchart according to the preferred embodiment of the present invention, this figure being divided into four parts.

Correction of pronunciation according to an embodiment of the present invention will now be explained in conjunction with the flowchart of FIG. 9-1.

This flowchart is constituted to effectively correct the pronunciation by providing steps 89 to 103 in which the trainee compares his pronunciation with that of a native speaker to evaluate his pronunciation, relying in the auditory sense upon his own "ears" and in the visual sense upon the "form", for example, of his lips, tongue and jaw, prior to effecting steps 104 and thereafter of the embodiment.

First, steps 89 to 103 will be explained. As the operational mode M51 is executed in step 89 to start the reproduction of the video disk 1, an image such as the title of the introductory portion is reproduced on the video display 11. As the operational mode M54 is executed in the step 90, an image is displayed on the video display 11; i.e. a still image is displayed to show drilling modes such as modes E1 to E4 as to the right of step 90 in FIG. 9-1(a).

Figure 1A:
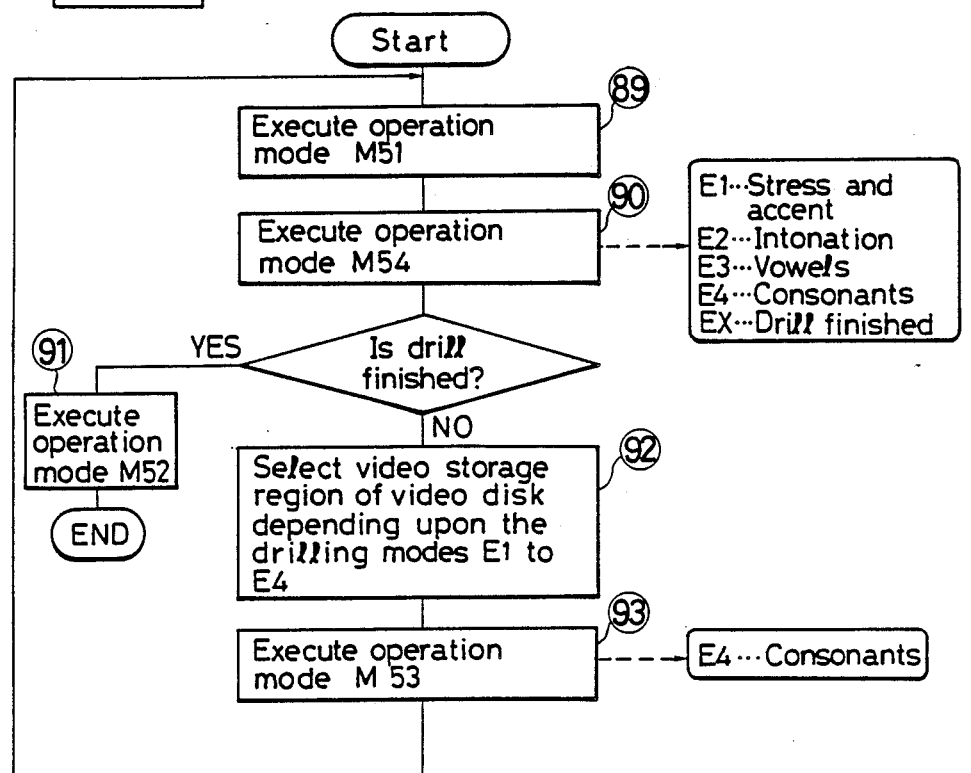
Figures 1B, 9:
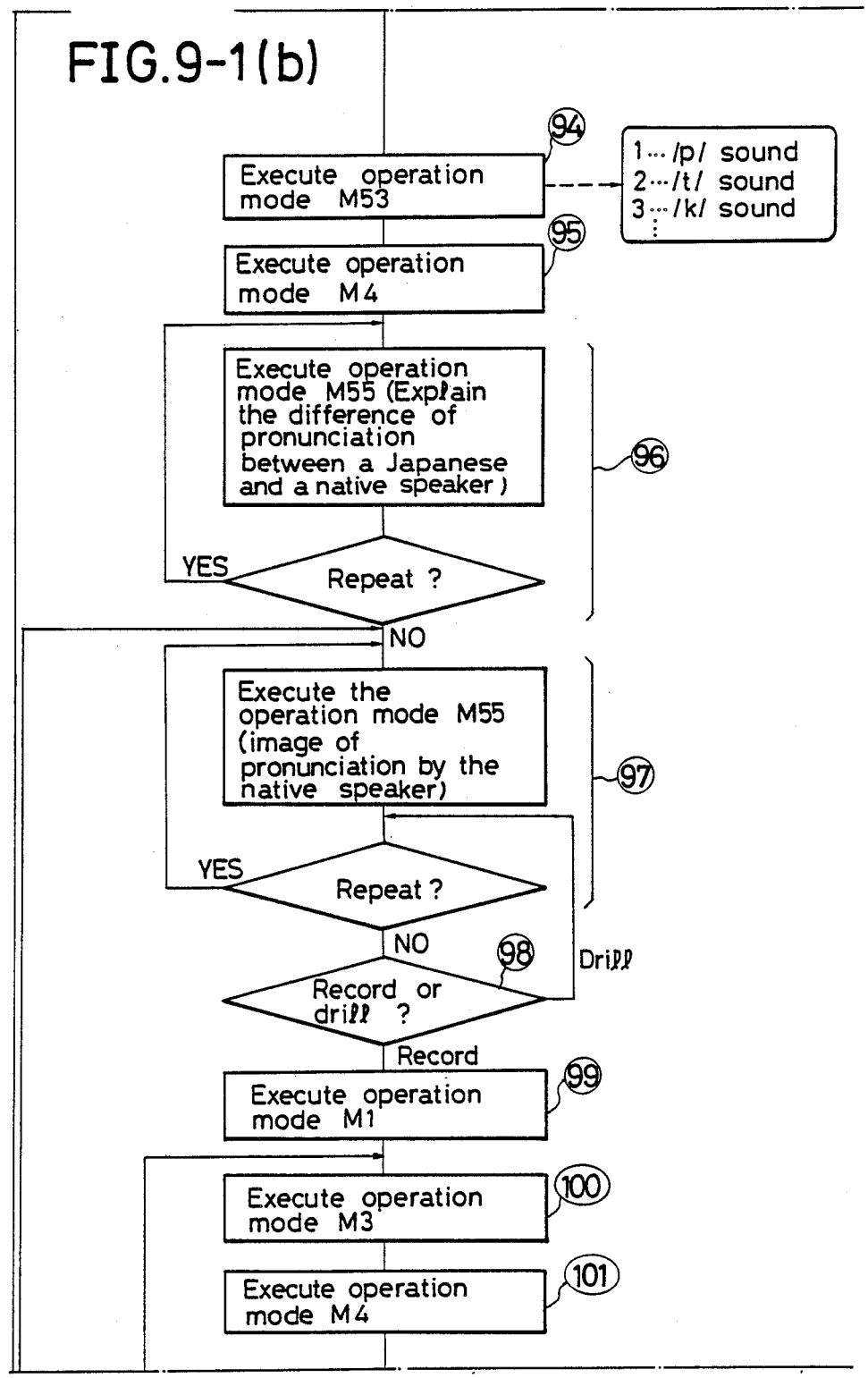
Figures 1C, 9:
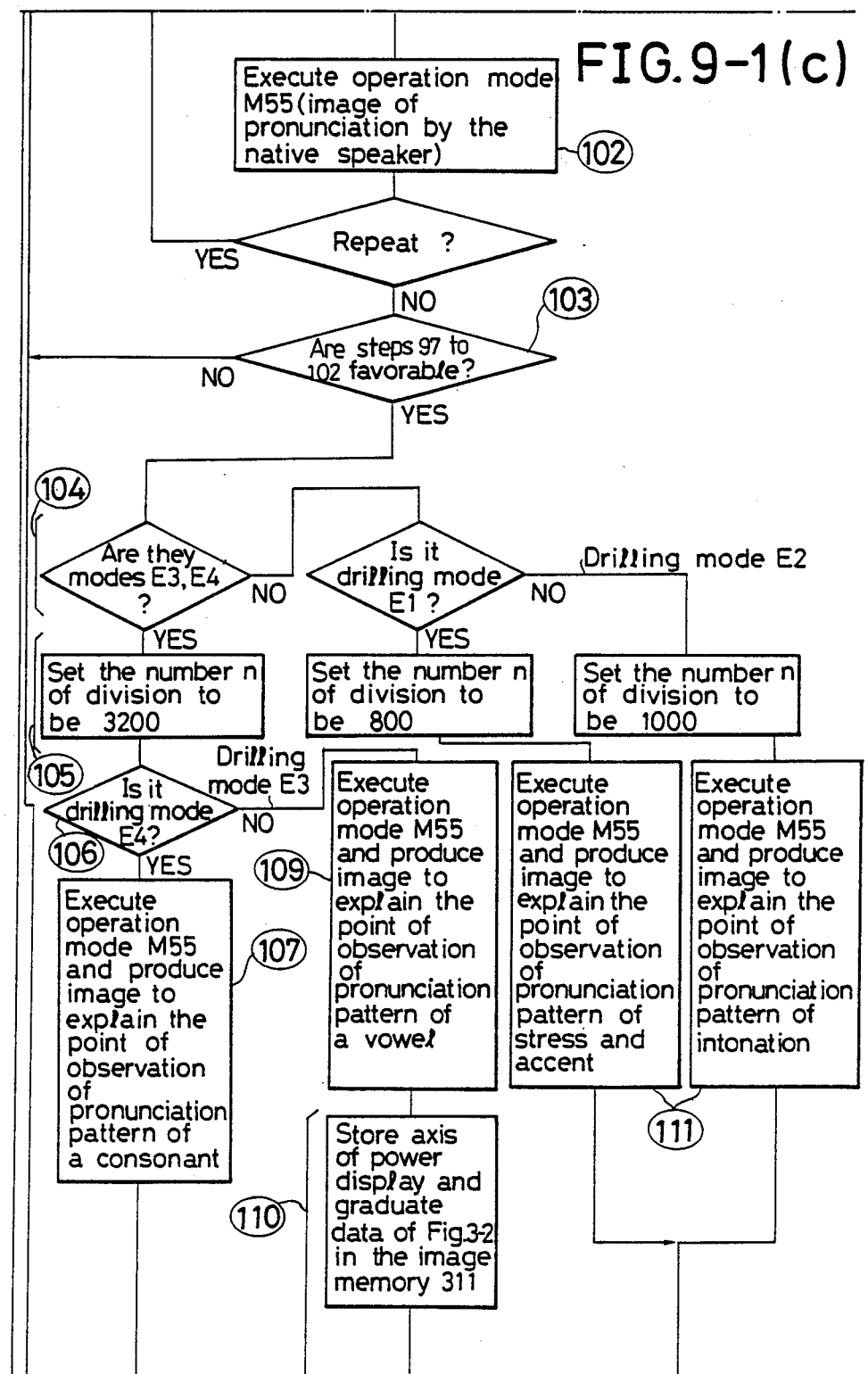
Figures 1D, 9:
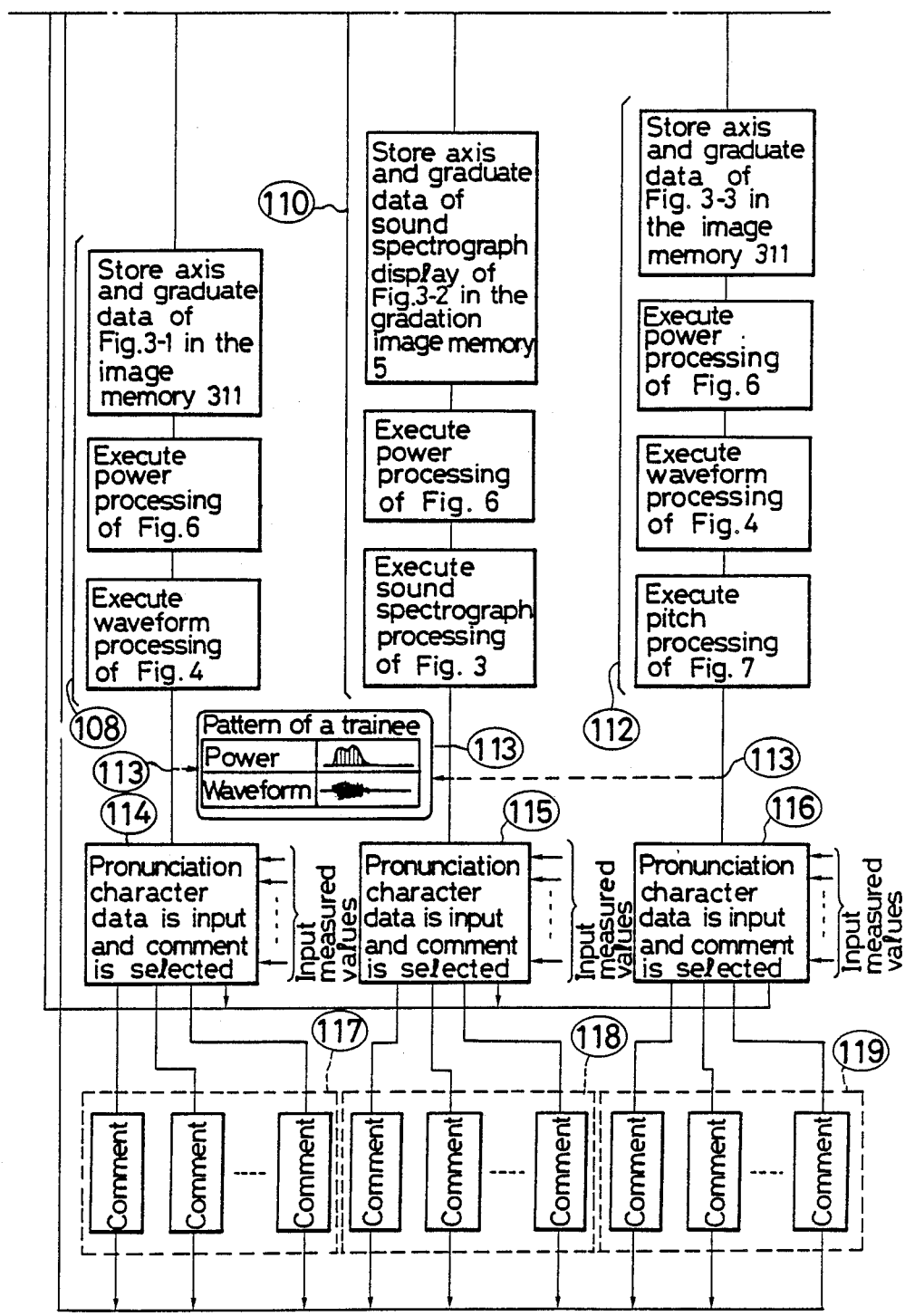
Figures 2, 9:
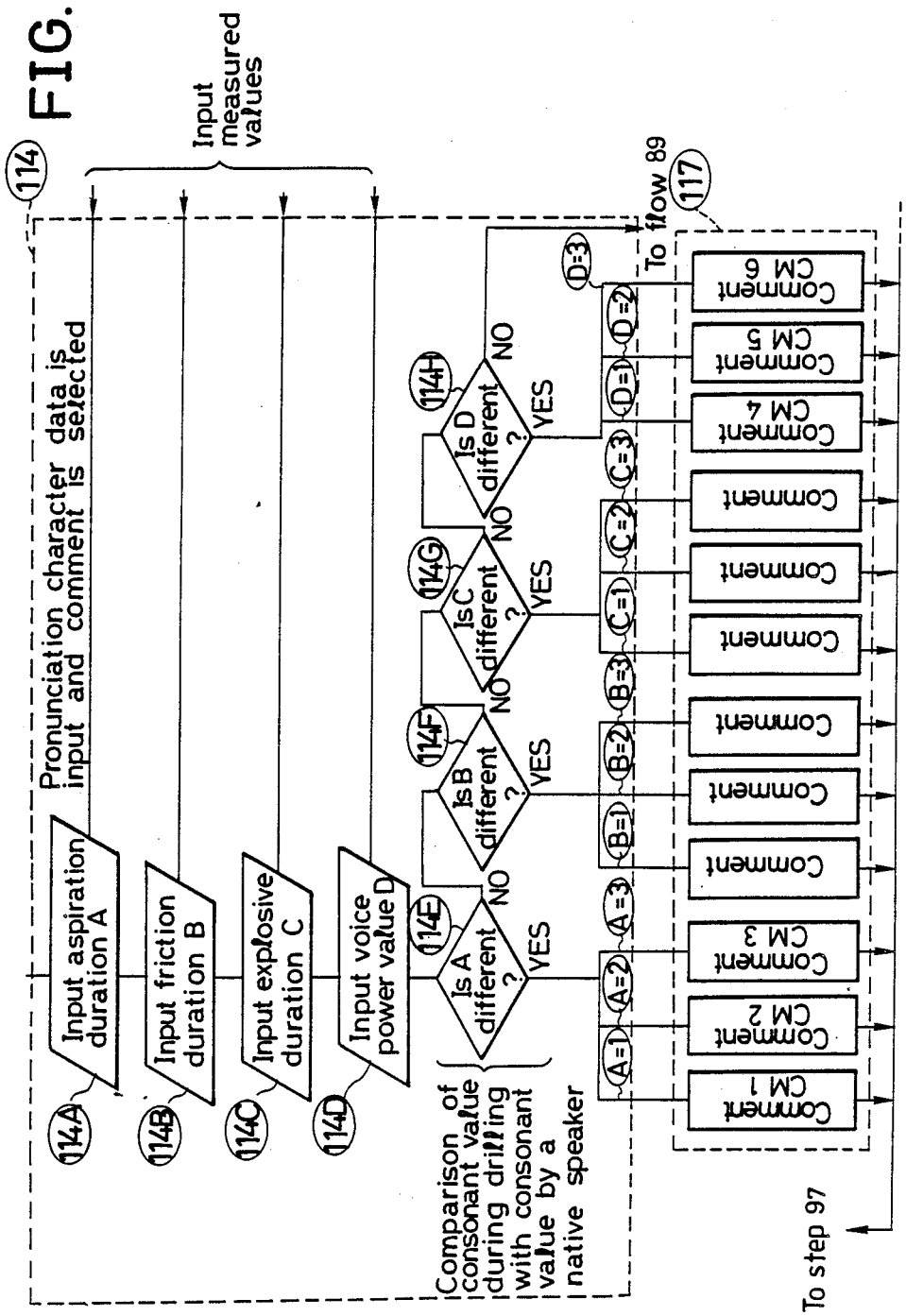

After the drill is finished, if EX is selected from the image, the operational mode M52 is executed in step 91 whereby the video disk 1 ceases to rotate. If any one of the drilling modes E1 to E4 is selected, step 92 selects a head frame number of a corresponding mode of the video disk 1 in which images corresponding to E1 to E4 are stored. Then, the operational mode M53 is executed in step 93 so that a static image is displayed to indicate the title of the selected drilling mode. To the right of step 93 in FIG. 9-1(a) is shown an image of when a consonant of the drilling mode E4 is selected. Step 94 executes the operational mode when there are detailed drilling items and displays the still image of the item menu. For example, in the case of a consonant of E4, any one is selected from the group including /p/ sound, /t/ sound, /k/ sound, ... The flowchart is set such that the operational mode M4 is executed in step 95, and voice signals of the video disk 1 are sounded from the loudspeaker. Here, the operational mode M4 may be executed prior to step 89 to produce background music of the image such as the title of the introductory part, or to explain the contents before displaying the still image. The operational mode M55 is executed in step 96 to explain the difference of pronunciation between the Japanese and the native speaker chiefly with reference to the manner of voicing the utterance (formation of the lips, tongue, jaw, etc.). Step 96 can be executed repetitively. In step 97, the trainee learns the manner of pronunciation by the native speaker. Step 97 can be executed repetitively. If it is desired to voice the utterance only, the operational mode M2 may be executed to store the pronunciation by the native speaker in the voice memory 4, and then the operational mode M3 is executed so that the content of the voice memory 4 is repetitively sounded from the loudspeaker.

In step 98, the trainee compares the movements of the lips, tongue, jaw and the like while looking at the mirror 12 to this satisfaction, in order to exercise the pronunciation. As required, step 97 is repeated to learn the image of pronunciation by the native speaker.

When the exercise is finished, the trainee stores his own utterance in the voice memory 4 to compare it with the utterance by the native speaker. In step 99, the operational mode M1 is executed to store in the voice memory 4 the voice signals uttered by the trainee into the microphone 9, and in the step 100 the operational mode M3 is executed so that the pronunciation of the trainee is sounded from the loudspeaker 10. Thereafter, in step 101 the operational mode M4 is executed to sound the voice signals of the video disk 1 through the loudspeaker 10, and in step 102 the image of the pronunciation by the native speaker is enabled, as in step 97, so that the trainee can watch and listen. By repeating steps 100 to 102, the pronunciation by the native speaker can be presented alternatingly.

The diagnosis and correction of pronunciation of steps 89 to 102 are thus finished. Step 103 determines whether the outcome of steps 89 to 102 to favorable or not. When it is favorable, the program proceeds to the diagnosis of the pronunciation by the steps of the present invention. When it is not favorable, the program proceeds again to step 97.

According to the present invention, the trainee first visually recognizes the character found by analyzing the pronunciation and the point of observation where the differences from the native speaker distinctly appear. The trainee then watches the pattern of a voice parameter displayed in operational modes M651 to M63 by analyzing his own pronunciation. If the trainee inputs the pronunciation character data measured from the pattern, it is compared with model pronunciation character idea, following which corrective commentary is displayed depending upon the result of the comparison. The trainee corrects his own pronunciation with reference to the commentary.

Details will now be explained in conjunction with the flowchart.

First, any one of the drilling modes E1 to E4 is selected in step 104.

Next, as a preparation for selecting the display of the voice parameter from operational mode M61 to M63, the number n of division is set in step 105. In the exercise dealing with a sentence such as stress and accent in drilling mode E1 and intonation in drilling mode E2, the time for recording the voice onto the voice memory 4 tends to be lengthened. Therefore, the number n of division is reduced to lengthen the time t of display of one stage on the display 33. On the other hand, in exercising the words that are not long, such as vowels in drilling mode E3 or consonants in drilling mode E4, the number n of division is increased and the time t is set to be short. It can be considered to change the time t depending upon the duration for recording the voice. However, frequent change in the unit of display time axis may become a hindrance to the trainee.

Next, operational modes M61 to M63 are executed for each of the drilling modes E1 to E4.

If now drilling mode E4 is selected, it is separated from E3 in step 106. In pronouncing the consonants in drilling mode E4, the point of observation chiefly covers durations of aspiration, frication and an explosive. In step 107 operational mode M55 is executed, producing an image to explain the point of observation.

Next, the above-mentioned processing for the power and waveform is carried out in step 108 in which characteristics are well expressed, such as the durations of aspiration, frication and an explosive.

When the drilling mode E3 is selected, operational mode M55 is executed in step 109, producing an image to explain the appearance of a formant which is characteristic to the pronunciation pattern of a vowel, as well as the duration and power obtained by standardizing the vowels. Then, step 110 effects the above-mentioned processing for the sound spectrograph and power in which the above-mentioned characteristics appear.

Attention will have to be give to the appearance of the formant of the same consonants such as /m/, /n/, /r/, . . . among the consonants in the drilling mode E4. In such a drill, the program is exceptionally directed to step 110 via step 109 to execute operational mode M62.

When the stress and accent of the drilling mode E1 are selected or the intonation of E2 is selected, attention is given to the power or the pitch. Therefore, operational mode M55 is executed in step 111, producing an image to explain the viewpoint. Then, the above-mentioned processing for the power, waveform and pitch is executed in step 112. When the stress and accent of the drilling mode E1 are selected, the processing may be executed for the power and waveform only.

The results processed in steps 108, 110 and 112 are displayed on display 33 in step 113 according to the operational modes M61, M62, and M63.

Figure 11A:
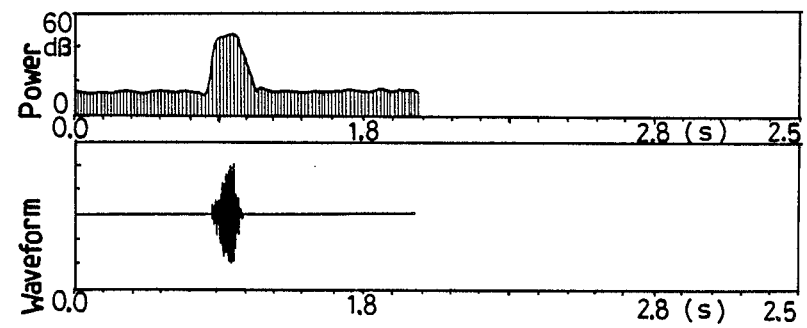

In the case of drilling mode E4 of consonants, for example, the operational mode M61 is executed through steps 107 and 108 so that the power and waveform of a trainee are displayed on the display 33 as shown in FIGS. 11(A) and 11(B). While looking at the patterns of his own power and waveform, the trainee measures by himself the durations of portions to which attention should be given, such as aspiration, frication and explosive power, that constitute viewpoints for pronouncing the consonants previously explained in step 107, and inputs the measured values in the form of numerical values in step 114.

Details will now be explained in conjunction with FIG. 9-2. The measured values are input in steps 114A-114 D. Here, the measured values are input in the form of numerical values of three stages, i.e., 1, 2 and 3. The value "1" is input when the quantity is small, "3" is input when the quantity is great, and "2" is input when the quantity is intermediate.

Figure 10A:
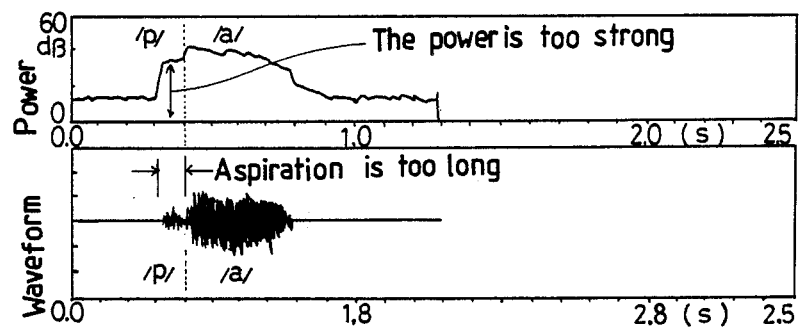

It is now presumed that voice patterns of power and waveform accompanying the pronunciation of "pa" of the trainee are as shown in FIGS. 11(A) and 11(B). Compared with the voice patterns of the native speaker shown in FIGS. 10(A) and 10(B), there does not quite exist aspiration of the sound "p" to which attention is being given. Therefore, A=1 is input in step 114A. This pronunciation is quite irrelevant to the frication or the explosive. Therefore, B=1 and C=1 are input in steps 114B and 114C, respectively. Since the sound "p'8 to which attention should be given does not quite have power as shown in FIG. 11(A), D=1 is input in step 114D. Therefore, the measured values (A, B, C, D)=(1, 1, 1, 1) are finally input. Next, the thus input measured values are compared in steps 114E to 114H with the values of the native speaker that correspond to consonants during the exercise that have been converted into numerical values in advance. As will be obvious from the patterns of power and waveform shown in FIGS. 10(A) and 10(B), the sound "p" produced by the native speaker features a strong power and long aspiration. Therefore, pronunciation (A, B, C, D) by the native speaker is converted into numerical values (3, 1, 1, 3). If the measured values that are input are in perfect agreement with the numerical values of the native speaker, it means that the sound "p" is pronounced favorably, and steps 114E to 114H all render the decision NO. The program then proceeds to step 89 to select the next assignment. If the values are not in agreement, a problem resides in the pronunciation. In this case, some of the steps 114E to 114H will render the decision YES, and one of the comments of step 117 is displayed on the display 33. In order to execute the correction of pronunciation with reference to the commentary, therefore, the program proceeds to step 97, and the trainee tries again starting from step 97. In this example, the measured value A=1 is compared with A=3 of the native speaker in step 114E, whereby the decision YES is rendered and commentary CM1 for A=1 is displayed. The commentary may, for instance, be "Aspiration is too short. Close your lips and strongly exhale out of your mouth". The trainee tries again from step 97 in compliance with commentary CM1, such that the aspiration is lengthened. The result of correction is displayed again on the display 33 in step 113 via steps 107 and 108. Through these steps, pronunciation by the trainee can be brought close to the voice parameter of the sound by the native speaker shown in FIG. 10.

Commentary CM2 for A=2 will, for instance, be "Length of aspiration is not enough. Practice to follow the pronunciation of the native speaker while paying attention to the length of aspiration." Commentary CM3 will, for example, be "Aspiration is too long. Close your lips and lightly exhale out of your mouth."

This time, the aspiration pronounced by the trainee is long and A=3 is input in step 114A. However, the power is still weak and D=2 is input in step 114D. The measured values that are finally input are (A, B, C, D)=(3, 1, 1, 2). Accordingly, the measured value D=2 is compared in step 114H with D=3 of the native speaker, whereby the decision YES is rendered and commentary CM5 for D=2 is displayed. Commentary CM5 may, be instance, be "The strength of power is not enough. Practice to follow the pronunciation of the native speaker while paying attention to the strength of power." In compliance with this commentary, the trainee tries again starting from step 97, and tries to correct the pronunciation so that the power is intensified. As a result of drilling the pronunciation of the trainee approaches the pronunciation of the native speaker shown in FIG. 10. This time, D=3 is input in step 114D, so that the measured values (A, B, C, D)=(3, 1, 1, 3) are finally input. Steps 114E to 114H all render the decision NO, and the program proceeds to step 89 to select the next assignment.

The trainee repeats the steps 97 to 117 with reference to the commentary to correct his pronunciation until steps 114E to 114H all render the decision NO.

Commentary CM4 may, for example, be "The power is too weak. Exhale in an increased amount out of your mouth." Commentary CM6 may, for instance, be "The power is too strong. Exhale in a decreased amount out of your mouth."

Steps 114 and 117 were explained in detail in the foregoing. Steps 115, 118 and 116, 119 are processed in the same manner.

The aforementioned embodiment has dealt with the English language. If texts are prepared, however, the apparatus of the present invention can further be adapted to drilling pronunciation of other languages, such as Chinese, German, French, and the like, to drilling pronunciation by people who are handicapped in their speech, and to drilling pronunciation of the Japanese language by foreigners.

According to the present invention as explained in the foregoing, the trainee obtains commentary for correction from the results of comparison of the pronunciation character data measured from the patterns of voice parameters of his own pronunciation with the model pronunciation character data. The trainee therefore is allowed to effectively drill his pronunciation so as to approach standard voice patterns by the native speaker. Furthermore, the trainee can grasp the progress of his learning, which will promote his desire for learning.

The foregoing description off the preferred embodiment of the invention has been presented for the purpose of illustration. Other embodiments within the scope of the appended claims could be readily designed by one of ordinary skill in the art.

What is claimed is:

1. An apparatus for drilling pronunciation comprising:
   (a) reproducing means for reproducing a plurality of reference electrical analog voice waveform signals corresponding to a predetermined model utterance;
   (b) first transducing means for transducing audible voice waveform signals of a trainee into a plurality of drill electrical analog voice waveforms signals;
   (c) analog-to-digital converting means for converting electrical analog voice waveform signals into signals representing digital samples, said analog-to-digital converting means being selectively coupled to receive said reference electrical analog voice waveform signals from said reproducing means or said drill electrical analog voice waveform signals from said first transducing means;
   (d) means for displaying images by reproducing a video disk, said images representing the characteristics in changes with time of voice parameters required in a selected drilling mode;
   (e) processing means coupled to receive and process said digital samples to obtain digital data presenting voice parameters required for the selected drilling mode, said voice parameters being selected from power, waveform, sound spectrograph, and pitch, said digital data comprising a first set of digital data corresponding to said drill electrical analog voice waveform signals and a second set of digital data corresponding to said reference electrical analog voice waveform signals;
   (f) means for displaying at least two voice parameters out of said digital data;
   (g) keyboard means for inputting numeric values corresponding to characteristics of said voice parameters, said characteristics being observed in respect of changes with time;
   (h) comparison means for comparing digital data representing said inputting numeric values with digital data representing reference numeric values corresponding to the characteristics of a model pronunciation; and
   (i) means for displaying a comment in dependence on the results of said comparison of numeric values, said displayed comment indicating a method of correcting pronunciation to the trainee, said comment being selected from a plurality of pre-stored comments on the method of correcting pronunciation.

2. The apparatus as defined in claim 1, further comprising means for displaying digital data corresponding to said reference electrical analog voice waveform signals for one of said plurality of predetermined voice parameters.

3. The apparatus as defined in claim 1, further comprising second transducing means for transducing said reference electrical analog voice waveform signals into audible reference voice waveform signals.

4. The apparatus as defined in claim 1, wherein said reproducing means includes means for reproducing video signals, further comprising means for displaying said video signals.

5. The apparatus as defined in claim 1, wherein said processing means comprises means for dividing the digital samples stored in said memory means, corresponding to one of said two pluralities of electrical analog voice waveform signals, into a plurality of groups in dependence upon a predetermined number, and means for processing the digital samples in each group to obtain a calculated digital value for each group.

6. The apparatus as defined in claim 5, further comprising input means for selecting said predetermined number, and means for displaying said calculated digital values corresponding to said one of said two pluralities of electrical analog voice waveform signals.

7. The apparatus as defined in claim 3, further comprising digital-to-analog converting means for converting signals representing digital samples into electrical analog voice waveform signals, and switching control means connected to said first and second transducing means, to said analog-to-digital converting means, to said digital-to-analog converting means, to said reproducing means, and to said processing means, said switching means comprising a plurality of switch means set in dependence on operational mode signals received from said processing means, a first amplifier having an output connected to said analog-to-digital converting means, a first low-pass filter having an output connected to an input of said first amplifier, a second amplifier having an output connected to said second transducing means, and a second low-pass filter having an output connected to an input of said second amplifier, said plurality of switch mean comprising first switch means for switchably coupling said first low-pass filter to said first transducing means, second switch means for switchably coupling said first low-pass filter to said reproducing means, third switch means for switchably coupling said second low-pass filter to said reproducing means, and fourth switch means for switchably coupling said second low-pass filter to said digital-to-analog converting means.

8. The apparatus as defined in claim 1, wherein said means for displaying a time relationship between at least two of said voice parameters comprises memory means for recording and reproducing digital samples, said memory means being coupled to said analog-to-digital converting means for recording digital samples of said reference electrical analog voice waveform signals and of said drill electrical analog voice waveform signals.

9. The apparatus as defined in claim 8, further comprising means for dividing said signals representing digital samples in said memory means into a plurality of groups according to a dividing number n, said dividing number n being set depending on the kind of said drilling modes; means for extracting two or more kinds of voice parameters for each of said groups, said voice parameters being selected from power, waveform, sound spectrograph, and pitch; and means for indicating said extracted two or more kinds of voice parameters on the same time axis.

10. An apparatus for drilling pronunciation comprising:

means for displaying images by reading a video disc on which are stored video signals corresponding to said images which represent a plurality of patterns and the characters of said patterns, said patterns including:
power and waveform which are voice parameters obtained by analyzing a model pronunciation when a drilling mode of consonants is selected;
power and sound spectrograph when a drilling mode of vowels is selected;
power when a drilling mode of stress and accent is selected; and
pitch when a drilling mode of intonation is selected;

process means for converting digital samples converted from electrical analog waveform signals of a trainee into digital data representing said voice parameters which are required in a selected drilling mode;

means for displaying said digital data as patterns of voice parameters;

comparison means for comparing numerical data inputted through a keyboard, said numerical data being obtained by converting into one of a plurality of stages the characteristics observed from the patterns of voice parameters of the trainee, and numerical data obtained by converting into numerical values those characteristics of the voice parameters of the model which correspond to the characteristic of the trainee, said characteristics of voice parameters of the model being pre-stored in a computer and said characteristics of voice parameters of the trainee including:
durations of aspiration, frication, and of explosive as well as power in the case of the drilling mode of consonants;
appearance of a formant and duration and power obtained by standardizing the vowels in the case of the drilling mode of vowels;
power in the case of the drilling mode of stress and accent; and
pitch in the case of the drilling mode of intonation; and means for indicating to the trainee steps to correct the trainee's pronunciation when the numerical data of the trainee and of the model are found different upon comparison of said numerical data, by selecting and displaying a commentary corresponding to the inputted numerical data out of a plurality of commentaries on the steps for correcting pronunciation.

* * * * *

UNITED STATES PATENT AND TRADEMARK OFFICE
CERTIFICATE OF CORRECTION

PATENT NO. : 4,969,194

DATED : November 6, 1990

INVENTOR(S) : Ezawa et al.

It is certified that error appears in the above-identified patent and that said Letters Patent is hereby corrected as shown below:

```
In the Title Page, left column;
    After " (22) filed:  August 25, 1989"
        insert the following:
            __ Related U.S. Application Data
    (63) continuation of 136,862, December 22, 1987,
                        abandoned--
```

Signed and Sealed this

Eighth Day of September, 1992

Attest:

DOUGLAS B. COMER

*Attesting Officer*  *Acting Commissioner of Patents and Trademarks*